United States Patent
Ingalls

[15] 3,662,613
[45] *May 16, 1972

[54] VARIABLE SPEED TRANSMISSION
[72] Inventor: Robert A. Ingalls, Springfield, Vt.
[73] Assignee: Simmonds Precision Products, Inc., Tarrytown, N.Y.
[*] Notice: The portion of the term of this patent subsequent to Aug. 26, 1986, has been disclaimed.
[22] Filed: June 11, 1970
[21] Appl. No.: 45,286

[52] U.S. Cl. .................................................. 74/371, 74/366
[51] Int. Cl. .......................................... F16h 3/08, F16h 5/08
[58] Field of Search ................................... 74/366, 371, 362

[56] References Cited

UNITED STATES PATENTS 3,463,028  8/1969  Polidor ................................... 74/371

Primary Examiner—Carlton R. Croyle
Assistant Examiner—Thomas C. Perry
Attorney—Edwin E. Greigg

[57] ABSTRACT

This invention relates to a variable speed transmission, the operative elements of which include a series of tapered output gears of different diameter but equal pitch which are rotatably mounted on a tubular member with a clutch arranged for translational movement within the tubular member and adapted to engage any one of a series of output gears to control the speed of the transmission. An input gear tapered in a plane parallel to that of the output gears is arranged to drive an elongated cylindrical gear and to transmit therethrough the drive motion to any of the tapered output gears.

10 Claims, 7 Drawing Figures

Inventor
Robert A. Ingalls
by
Edwin L. Grigg

PATENTED MAY 16 1972

VARIABLE SPEED TRANSMISSION

BACKGROUND OF THE INVENTION

This invention relates to a variable speed transmission, particularly a variable speed transmission of the type employing a series of tapered gears of different diameter but equal pitch which include on the inner and outer surface rows of teeth with each gear mounted in side by side relation on a tubular element provided with an elongated slot, the gears being arranged to be rotatable relative to the tubular element by means of a clutch which may be moved longitudinally along the interior of the tubular member and adapted to mesh with the teeth provided on the inner circular wall of the gears, the speed of the driven element of the transmission depending at least partially upon the diameter of the gear of the series of gears with which the power transmitting means is in mesh at any particular time.

Variable speed transmissions are not generally new. However, in the transmissions that have heretofore been proposed, the problem of transition from one speed to another has not been entirely satisfactory. The gears of the series of gears of different diameter but equal pitch have been operatively connected with their shafts by clutching means such as a pawl and rachet mechanism. Clutching means such as pawl and rachet mechanisms do not provide for smooth transition in speed as the power transmitting gear means moves along a series of gears of different diameter. Consequently, the power flow is uneven.

OBJECTS OF THE INVENTION

It is the primary object of the invention to provide a compact variable speed housed transmission unit which is of simplified construction and thus economical to manufacture.

Another object of the invention is to construct the transmission of a number of plastic elements prepared by any suitable process thus reducing the overall cost thereof.

Still another object of the invention is to mount a series of output gears of different diameter but equal pitch on an elongated slotted tubular member and provide therewithin a clutch arranged for translational movement relative to the gears to drive any one of the series thereof from the input means.

BRIEF DESCRIPTION OF THE DRAWINGS

These and other objects and advantages of the invention will become apparent from a detailed study of the following specification and drawings in which.

DESCRIPTION OF THE PREFERRED EMBODIMENT

Figure 1:
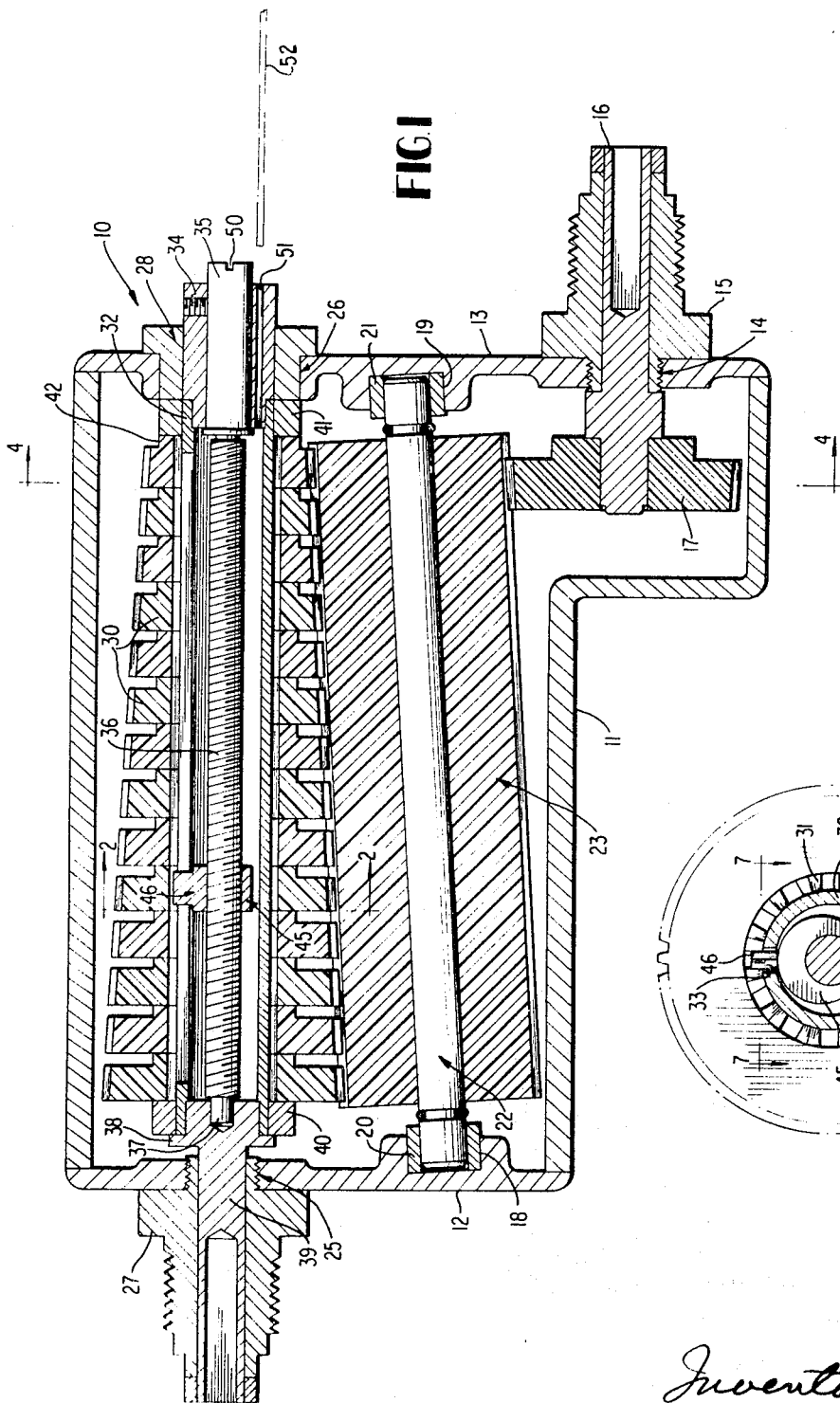
FIG. 1 is a side view of the transmission partially in section and partially in elevation showing the general organization of the cooperative elements.

Turning now to the drawings, the variable speed transmission shown in FIG. 1 and indicated generally as 10, includes a housing 11 shown in cross-section and provided at opposite ends with suitably apertured end plates 12 and 13 each of which are removably secured to the housing proper by any suitable demountable means.

In the threaded opening 14 is securely positioned a longitudinally perforated bushing 15 and extending axially therethrough and exteriorly of the bushing is a drive shaft member 16 which is adapted to function as an input from a source of power, not shown, the opposite end of the input shaft being arranged to provide a driving motion into the tapered gear 17 that is fastened to the opposite end thereof. It will be noted that the teeth of the gear 17 which may be of any suitable plastic are tapered in a forwardly or converging direction as seen looking into the drawing of FIG. 1.

Figure 4:
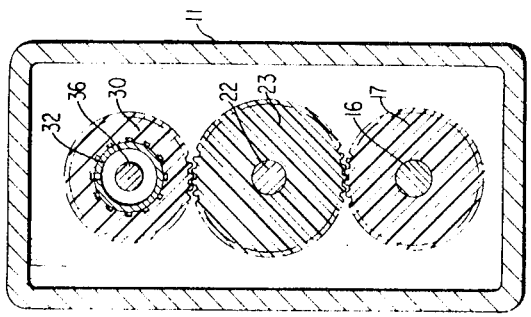
FIG. 4 is a sectional view on line 4—4 of FIG. 1.
Figure 3:
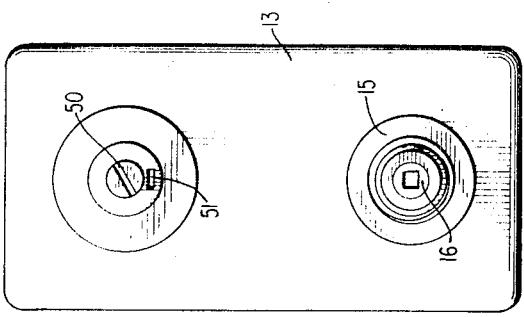
FIG. 3 is an end elevational view of the power input to the transmission.
Figure 7:
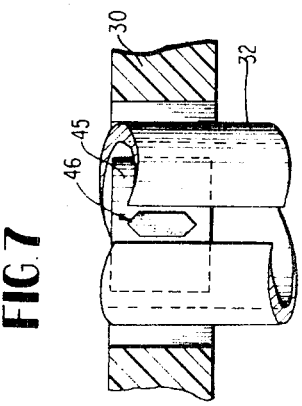
FIG. 7 is a view on line 7—7 of FIG. 2.

As viewed in the cross-sectional view (FIG. 4) of the housing 11 it will be observed that the housing per se is compact and not much greater in width than is required to provide for operation of the transmission elements. An access opening (not shown) is also provided in either side of the housing to permit checking the condition of the transmission when necessary.

As best seen in FIG. 1, the end walls 12 and 13 of the housing are provided with perforations 18 and 19, respectively, and within each of these are positioned bushings 20 and 21, said bushings being arranged to revolubly support, at a canted angle, corresponding to the taper of the teeth of gear 17, the shaft 22 of spur idler gear 23.

The spur idler gear 23 may be made of any suitable plastic material such as NYLATRON and molded onto the shaft 22 so as to become an integral part thereof with neither part being capable of movement independent of the other.

It is believed to be clear from the respective views of the spur idler gear 23 that the teeth 24, molded therein longitudinally thereof, and which are of equal pitch, extend the full length of the idler gear.

The upper area of the end walls 12 and 13 of the housing also includes in perpendicular alignment with the idler gear 23 means defining openings 25 and 26 for a purpose now to be described.

In the front wall 12 perforation 25 is threaded and thus adapted to receive one end of the complementally threaded bushing member 27. As in the structure previously described in connection with the input shaft 16 an output shaft for transmitting power is also arranged to extend through bushing 27.

Diametrically opposite from bushing 27 and at the other end of the housing 13 is another bushing 28 which is frictionally seated in the perforation 26 and the utility and operation thereof will be later understood.

For a better understanding of the individually driven tapered output gears 30 which are of a different diameter but equal pitch it will be noted that each of these gears are provided with tapered perimeters with the pitch thereof disposed at an angle or canted toward the input end of the housing 13 so that their perimeters are in constant rotary engagement with the idler gear 23.

Figure 2:
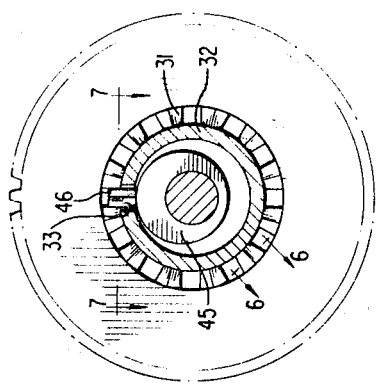
FIG. 2 is a sectional view on line 2—2 of FIG. 1.
Figure 5:
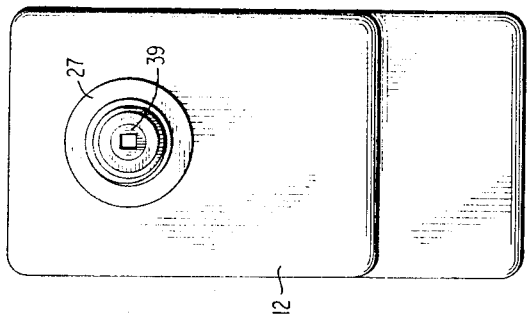
FIG. 5 is an end elevational view of the power output of the transmission.

As best seen in Fig. 2, the inner circular wall of the tapered gear 30 is also provided with gear teeth 31 which surround a sleeve-like carriage member 32 that is provided with an elongate slot 33 for a purpose that will become apparent as the description progresses.

At the input end of the transmission housing and within the bushing 28 is positioned an axially perforated sleeve-like liner 34 which is arranged to receive rotatably therein the smooth shank portion 35 of an elongate threaded means 36, the opposite end of which is reduced in area as shown and seated in the axial perforation 37 of the enlarged head 38 of the output shaft 39 which projects into the transmission housing.

As best shown, also in FIG. 1, one end of the longitudinally apertured sleeve 34 is attached to the enlarged head 38 of the output shaft 39 and secured in driving engagement therewith by an annular member 40, one wall of which abuts the shoulder on the enlarged head, and the other wall of which abuts one wall of the largest of the series of gears 30. At its other end the carriage member surrounds a reduced annular area on the sleeve 34 and fastened securely in driving relation thereto.

Figure 6:
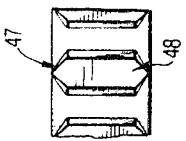
FIG. 6 is an enlarged view of one of the clutch teeth as seen on line 6—6 of FIG. 2.

The threaded shank 36 is provided with an internally threaded clutch selector member 45, the threaded portion in the body thereof being off center as best shown in FIG. 2 and provided at its perimeter with an offstanding keying or indexing means 46, the front and rear surfaces of which are beveled as at 47 and 48, respectively, (see FIG. 6) in order to facilitate sliding and non-blocking engagement of the beveled surface with any of the internal gear teeth provided on the tapered output gears 30.

A kerf 50 provided in the free end of the shank portion 35 permits translatory travel of the clutch member 45 and its radially extending key 46 so that it can be moved into driving engagement with any of the series of internal teeth 31 provided on the tapered output gears. Liner 34 is provided with a radially extending threaded aperture into which is introduced a set screw that may be forced into locking engagement with shank 35 to thus lock the threaded shaft 36 and its accompanying clutch 45 against inadvertent movement out of driving engagement with any particular gear.

In a parallel plane spaced from but adjacent to the axial perforation provided in sleeve liner 34 is formed an elongate slot 51 through which an indexing key shown in dotted outline may be introduced in order to preset the clutch means 45 into driving engagement with any particular output gear 30.

Although only a single embodiment of the invention has been depicted and described, it will be apparent that this embodiment is illustrative in nature and that a number of modifications in the apparatus and variations in its end use may be effected without departing from the spirit or scope of the invention as defined in the appended claims.

What is claimed is:

1. A variable speed transmission having power input and output means comprising a tubular means, a series of output gears of different diameter but equal pitch mounted on the tubular means, an elongated idler gear means arranged to engage the series of gears, input gear means arranged to engage and drive said idler gear and reciprocable clutch means adapted to drive any one of the series of gears to vary the output speed of the transmission.

2. A variable speed transmission as claimed in claim 1, wherein the clutch means includes means adapted to extend through said tubular means and engage any one of the series of gears to vary the ratio of the transmission.

3. A variable speed transmission as claimed in claim 1, wherein the tubular means is provided with an elongate slot, said clutch means including means adapted to extend through said elongate slot to engage any one of the series of gears to vary the ratio of the transmission.

4. A variable speed transmission as claimed in claim 2, wherein the clutch means is associated with means to provide for translational movement thereof relative to the series of gears.

5. A variable speed transmission as claimed in claim 3, wherein the clutch means is associated with means to provide for translational movement relative to the series of gears.

6. A variable speed transmission as claimed in claim 4, wherein the means arranged to provide for translational movement cooperates with means defining an opening in the clutch.

7. A variable speed transmission as claimed in claim 1, wherein the pitch of the input and output gears extend in parallel planes.

8. A variable speed transmission as claimed in claim 1, wherein said variable speed transmission is mounted in a housing means.

9. A variable speed transmission as claimed in claim 4, wherein the clutch means and the means associated therewith for translational movement of the clutch means include complemental means.

10. A variable speed transmission as claimed in claim 6, wherein the means providing for translational movement of the clutch means comprises an elongate threaded member.

* * * * *